United States Patent Office 3,548,260
Patented Dec. 15, 1970

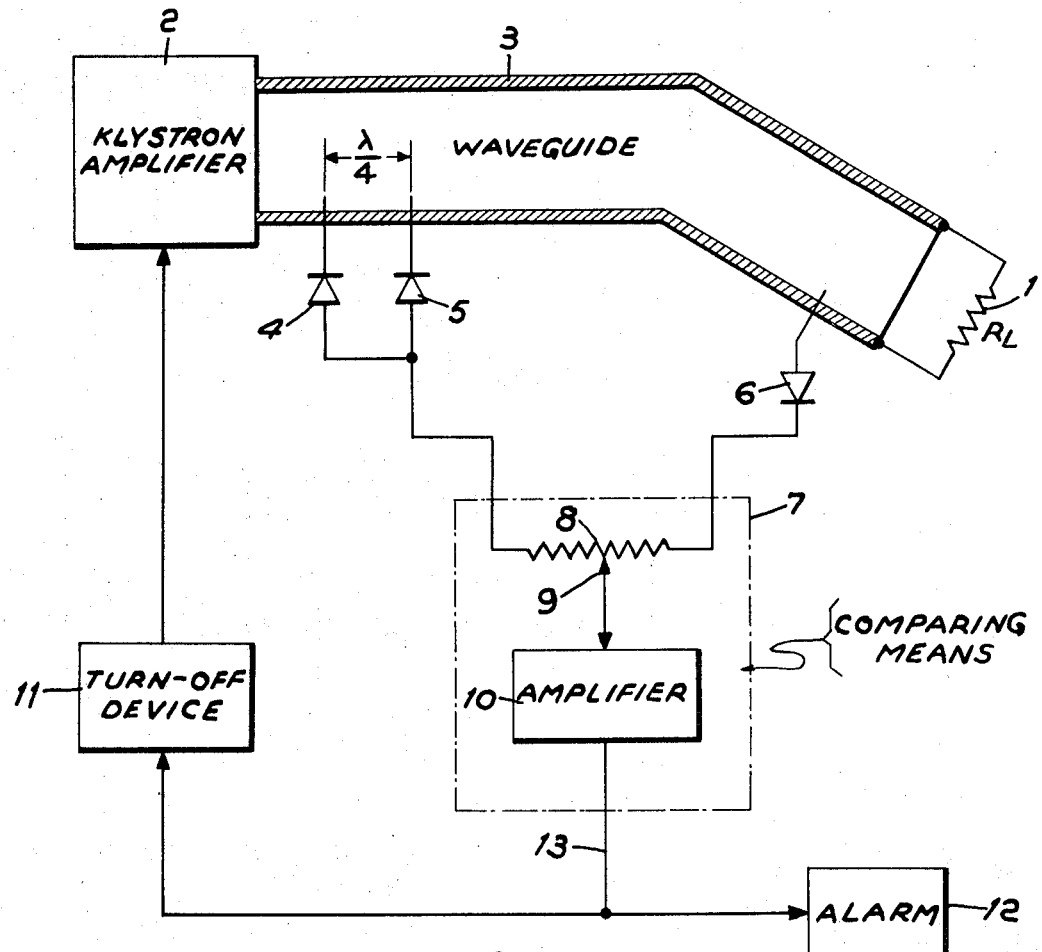
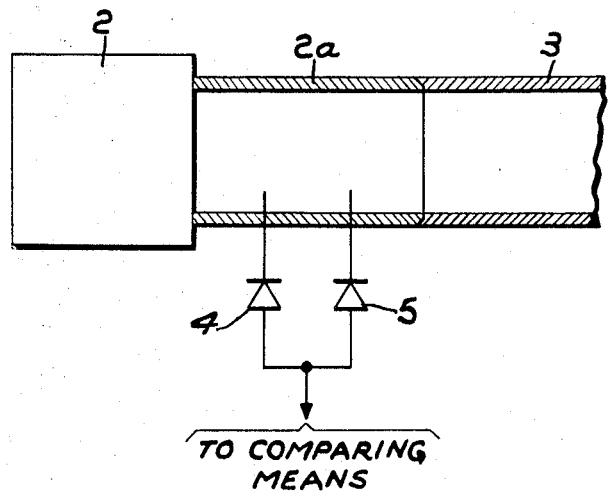

3,548,260
WAVEGUIDE ARC DETECTOR
Irving A. Krause, Nutley, N.J., assignor to International Telephone and Telegraph Corporation, Nutley, N.J., a corporation of Delaware
Filed Apr. 25, 1968, Ser. No. 724,042
Int. Cl. H02h 3/20, 3/28; H04b 3/04
U.S. Cl. 317—27
2 Claims

ABSTRACT OF THE DISCLOSURE

Probes are inserted in a waveguide to detect the field level at the input and output. The probe outputs are applied to a balanced comparing circuit. When an arc appears, an unbalance condition is created in the comparing circuit to trigger an alarm and turn off the equipment.

BACKGROUND OF THE INVENTION

This invention relates to waveguide arc detectors and more particularly to arc detectors that utilize probes spaced from each other mounted in a waveguide.

Prior art waveguide arc detectors utilize photocells mounted within the waveguide which produce electrical signals responsive to the light generated by an arc. One disadvantage of such a device is that it is unreliable in systems where there are bends in the waveguides. In such a case, depending upon the type of arc produced, the reflectivity of the walls of the waveguide and the sensitivity of the photocell, reliable operation is not assured. Another disadvantage of the photocell systems is that if the photocell becomes defective, there is no way to indicate that it has, and it may cause damage to the terminal equipment if the arcing continues.

SUMMARY OF THE INVENTION

Therefore, it is an object of this invention to provide a waveguide arc detector device for use in systems where there are bends in the waveguide and wherein a failure in the arc detecting circuitry itself will cause the generation of a signal indicating that a failure (either a detector failure or the appearance of an arc) is present.

According to this invention first and second probes spaced from each other are mounted in a waveguide. Coupled to said probes is a comparing means for providing an output signal responsive to a change in relative potential therebetween, thereby indicating the presence of an arc within said waveguide.

BRIEF DESCRIPTION OF THE DRAWING

The above mentioned and other objects of this invention will become apparent by reference to the following description taken in conjunction with the accompanying drawings in which FIGS. 1 and 2 illustrate the preferred embodiments of a waveguide arc detector showing the probes and comparing means arrangement according to the invention.

DESCRIPTION OF THE PREFERRED EMBODIMENT

Referring to the figure, load 1 is being fed by input means 2 which may be a klystron amplifier via a waveguide 3. Mounted within waveguide 3, adjacent to the input end, are probes 4 and 5 which may be spaced one-quarter wave length apart for providing an output proportional to the input signal level in said waveguide. Mounted adjacent to the load (output) end of the waveguide is a probe 6 for providing an output proportional to the output signal level coupled to load 1. The two input probes 4 and 5 are spaced one-quarter wave length apart so that if the intensity of the field within waveguide 3 at one probe due to an arc, is zero, the field intensity at the other probe will be at maximum. This guarantees that an output is always obtained from at least one of probes 4 and 5.

The outputs of probes 4 and 5 are OR-gated together and applied to comparing means 7 which comprises variable resistor 8 and amplifier 10. The output of probe 6 is also applied to resistor 8 which is adjusted to produce zero output at tap point 9 when no arc is present within waveguide 3. Probes 4, 5 and 6 are shown as diode probes and it should be apparent to one skilled in the art that any other type of suitable probe devices may be substituted by making the corresponding modifications in the comparing means 7. The output 13 of comparing means 7 is coupled to an alarm 12 which may be any type of alarm presently known in the art for providing an electrical, visual or audio output signal when it receives an electrical input. Output 13 is also coupled to turn-off device 11 which is further coupled to input means 2. When an arc is detected, turn-off means 11 is activated and causes input means 2 to turn off, thereby protecting the equipment from damage.

Depending upon the location of an arc which may appear in waveguide 3, the output of probes 4 and 5 can be expected to be greater than or equal to the normal operating value, while the output of probe 6 will be less than its normal operating value. This is because an arc within the waveguide will absorb some of the energy being fed to load. Therefore, upon the occurrence of an arc somewhere in the waveguide 3 an unbalance condition will be set up in comparing means 7 and an output signal 13 will be generated indicating the presence of an arc. With the diode polarities shown in the figure, the presence of an arc in waveguide 3 will result in a negative output at tap point 9 which is amplified by amplifier 10. It should be pointed out that the instant circuit is not dependent upon power level and can be used for low power levels where there is no danger of arcing within the waveguide. After the circuit is adjusted, its signal level may be increased to the desired operating level.

A feature of an arc detector according to this invention is that if the input probes 4 and 5 or the output probe 6 become defective, an unbalance condition will exist in comparing means 7, thereby providing an output indicating the presence of an arc. The operator, after checking and finding that an arc was not present, is thereby aware of a failure in the arc detecting circuitry itself. Therefore, it is seen that the instant arc detector has a fail-safe feature which is not present in the prior art systems.

It should be understood that this invention is not limited to the arrangement wherein the probes are located adjacent to the input and output ends of the waveguide, respectively. Another arrangement utilizing this invention is where the probes are located anywhere along the waveguide and are spaced from each other. In certain instances this arrangement may be more desirable. For example, one may wish to place arc detectors in different sections of a wave-guide since it may not be practical to mount the probes adjacent to the input and output ends of a waveguide, depending upon the particular configuration involved.

Referring now to FIG. 2, another useful adaptation of this invention is the insertion of the input probe of 4 and 5 directly in the window 2a of the klystron amplifier 2. This embodiment could be implemented by the manufacturer of the klystron and would result in a very economical invention. The user need only attach the waveguide 3 to the window 2a and the output probe 6 which would simplify the packaging.

While I have described above the principles of my invention in connection with specific apparatus, it is to be clearly understood that this description is made only by way of example and not as a limitation to the scope of my invention, as set forth in the accompanying claims.

I claim:
1. An arc detector for use in a waveguide fed by an input means comprising:
   a pair of diode probes mounted adjacent to the input end of said guide, said probes are spaced one quarter wavelength apart and coupled to provide an output which is proportional to the input signal level in said waveguide;
   another diode probe mounted adjacent the output end of said waveguide to provide another output which is proportional to the output signal level coupled to a load;
   comparing means including a variable resistor and an amplifier;
   said output from said pair of probes is coupled to one terminal of said variable resistor, said other output is coupled to the other terminal of said variable resistor, and said variable resistor having a tap point which is coupled to said amplifier and adjusted so that no output voltage appears thereat when no arc is present within said waveguide;
   an alarm coupled to respond to said amplifier to indicate the presence of an arc in said waveguide; and
   a turn-off device coupled between said amplifier and said input means, whereby an arc causes an unbalanced condition in said comparing means which activates said alarm and turn-off device.

2. The arc detector according to claim 1 wherein said input means is a klystron amplifier, and said pair of probes is mounted in the window of said amplifier.

References Cited

UNITED STATES PATENTS

| | | | |
|---|---|---|---|
| 2,498,720 | 2/1950 | Wild et al. | 317—58X |
| 2,993,181 | 7/1961 | Friedman et al. | 333—17 |
| 3,238,475 | 3/1966 | De Vita et al. | 333—17 |
| 3,448,414 | 6/1969 | Brunton | 333—17X |

JAMES D. TRAMMELL, Primary Examiner

U.S. Cl. X.R.

317—31, 44; 333—17